April 20, 1971      P. GREEBLER      3,575,803
REACTOR FUELING METHOD
Filed Aug. 8, 1968
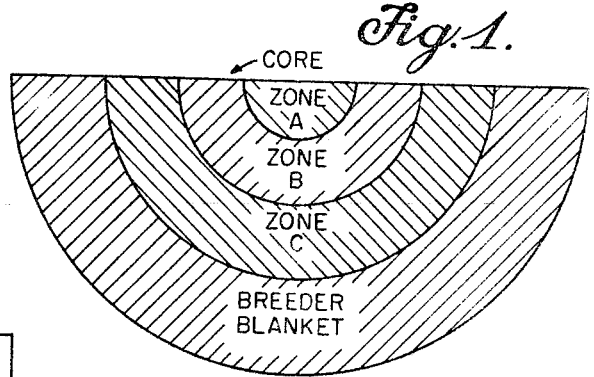
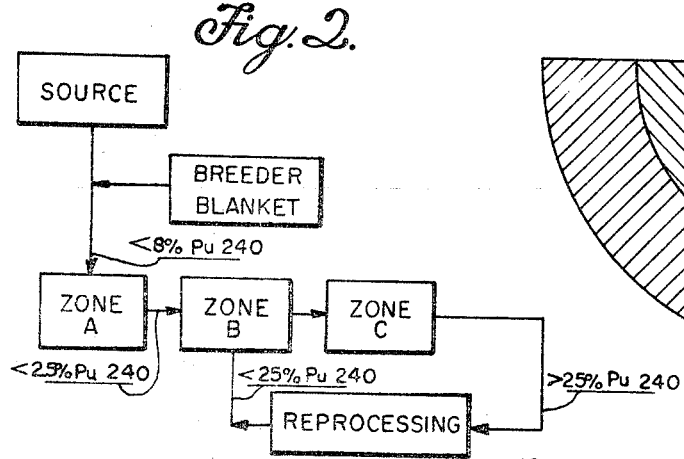
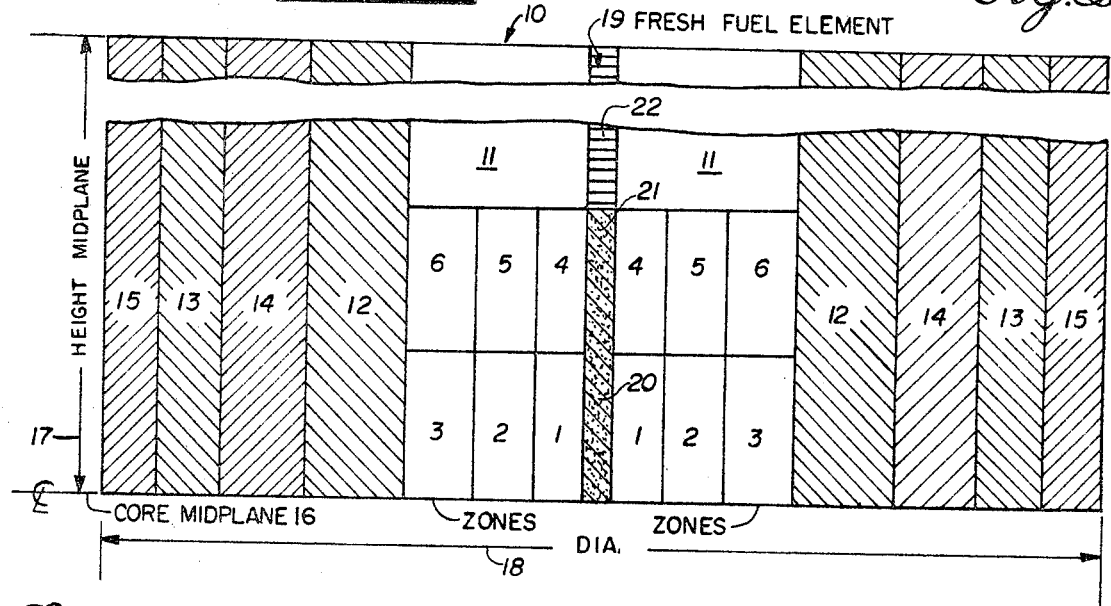
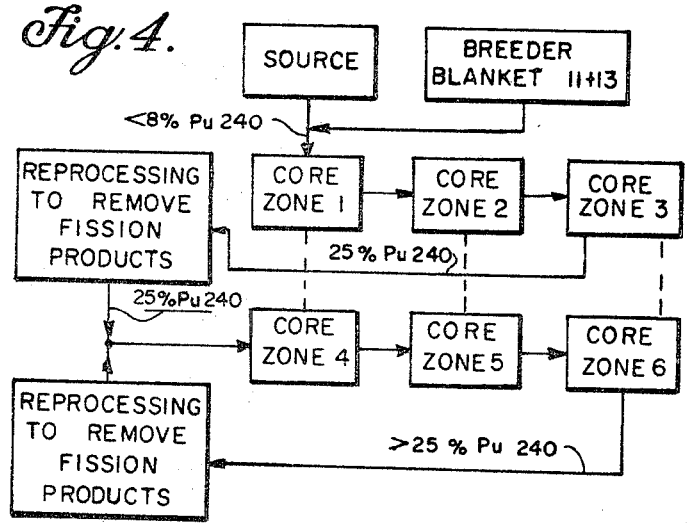
INVENTOR.
PAUL GREEBLER
BY
*Roland G. Anderson*
ATTORNEY 3,575,803
Patented Apr. 20, 1971

3,575,803
REACTOR FUELING METHOD
Paul Greebler, San Jose, Calif., assignor to the United States of America as represented by the United States Atomic Energy Commission
Filed Aug. 8, 1968, Ser. No. 751,100
Int. Cl. G21c 19/20
U.S. Cl. 176—30
8 Claims

ABSTRACT OF THE DISCLOSURE

A refueling method for a fast neutron sodium-cooled nuclear breeder reactor system which involves positioning fuel elements containing fissile fuel having a Pu-240 isotope content greater than 25% adjacent the breeder blanket at the core periphery and placing fuel elements having a Pu-240 isotope content less than 8% near the central region of the core. The result is a lowering of the positive coolant void reactivity in the central region. New fuel placed near the center core region is shuffled to the core periphery in an organized manner.

BACKGROUND OF THE INVENTION

The invention described herein was made in the course of, or under, AEC Contract No. AT(04-3)-189, Project Agreement No. 47, with the United States Atomic Energy Commission.

As well known, if fertile fuel, such as uranium-238 (U-238) is present in the fast reactor core or in what is called the "blanket" surrounding the core, it will be converted into fissile material, for example, plutonium-239 (Pu-239) by neutron capture, and if the loss of neutrons by escape can be kept to a minimum, it is possible for more than one neutron to be available, per fission, for the conversion of fertile into fissile material, thus being possible to produce more fissile material by neutron capture than is consumed by fission. Therefore, when the production of fissile material of a given kind is greater than that fissile material consumed in maintaining the fission chain, it is known as "breeding," and such a reactor is called a "breeder" reactor. It is also commonly known in the art that with conventional U-235 as the fissile fuel, with U-238, as the fertile fuel, placed in both the core and the blanket, neutrons in the reactor interact with the atoms of U-238, causing them to be changed to U-239, this isotope decaying to neptunium-239 (Np-239) and the latter in turn decaying to Pu-239. However, if Pu-239 is allowed to remain in the core, it will not only contribute to the fission chain, but it will also capture neutrons to produce isotope Pu-240. Neutron capture by Pu-240 results, in turn, in the formation of the fissible isotope Pu-241. The isotope Pu-240 is fissionable only by high energy neutrons—roughly above 100,000 electron volts—and acts as a fertile neutron absorber to the lower energy neutrons in the reactor. The replacement of Pu-239 by Pu-240 in the core fuel, in addition to the buildup of fission products, decreases the reactivity to such an extent that operational requirements of the reactor will no longer be satisfied, whereby the fuel will have to be removed long before the fissile and fertile materials are consumed in the reactor for reprocessing to remove the accumulation of fission products, whereafter the fuel is recycled for further burnup in the reactor.

As conventionally known, nuclear reactors are fundamentally classified by the kinetic energy (or speed) of the neutrons causing most of the fissions in a given reactor. Nearly all the neutrons liberated in fission have high energies and so, if no moderator is present in the reactor core or reflector, the majority of fissions are produced by fast neutrons, and a nuclear reactor in which this is the case is called a "fast" reactor.

As also well known, the breeding ratio of a breeder reactor is controlled by the moderating material and/or the disposition of the fertile material with respect to the fissile material, this being by ratio or by physical location of one to the other. However, this ratio must be greater than one in order to be a "breeder" reactor, the average ratio for such reactors being about 1.20 to 1.30. Fertile Pu-240 tends to increase the breeding ratio, and fission products decrease this ratio. It is thus seen that the breeding ratio can be readily affected by the above-described accumulation of fission products and isotopes such as Pu-240.

Two main types of breeding cycles are theoretically possible; one is based on a fast reactor using plutonium-239 as the fissile material and uranium-238 as the fertile species, and the other on a thermal (or fast) reactor utilizing uranium-233 and thorium-232, respectively, as the fissile and fertile materials. The fertile species is employed in the form of a blanket which surrounds the core, and so a large proportion of the neutrons escaping from the core are captured in the blanket. In most breeder reactor designs, especially for fast reactors, some fertile material, e.g., uranium-238, is included in the core. Fissile nuclei are then formed both in a large fast reactor, loss of It is also known that in a large fast reactor, loss of coolant, such as sodium, from the central portion of the core produces positive reactivity. Coolant loss from the outer portion of the core and from the blankets generally produces negative reactivity.

The positive coolant void reactivity effect in the central region of the reactor core is a safety hazard if its magnitude is large enough to produce a rapid reactivity ramp rate in a credible accident. Therefore, it is important to minimize the central positive coolant void reactivity effect.

Pu-240 and fission products are large contributors to the positive coolant void effect in plutonium-fueled fast reactors which recycles their plutonium and achieves high fuel burnup. If the core plutonium is recycled, using the "clean" (generally less than 8% Pu-240) blanket plutonium only for makeup, the Pu-240 isotopic content builds up to over 30% at steady-state recycle conditions in a typical large fast ceramic fueled reactor. The Pu-240 content of the core can be reduced to 25% or less by using the inventive recycling method in which more "clean" blanket plutonium and less "dirty" (generally greater than 25% Pu-240) core plutonium are used in fabrication of the new fuel elements. Even with such reduction of the Pu-240 content, however, it still contributes a positive sodium void reactivity.

SUMMARY OF THE INVENTION

The inventive method overcomes the above-stated prior problem to a substantial extent by utilizing the "clean" plutonium recycled from the blanket of a reactor and the "dirty" plutonium recycled from the core of a reactor to achieve a considerable improvement in coolant void reactivity effect. The plutonium discharged from the blanket of one reactor is reprocessed and used in the fabrication of new fuel elements to be placed in the central regions of the core of the same reactor or in a similar reactor in a system (or used in the central portion of such new fuel elements). Plutonium discharged from the core of one reactor is reprocessed and used in the fabrication of new fuel elements to be placed in the outer regions of the core of the same or similar reactor of the system (or used in the outer core portions of such new fuel elements). The novel effect is enhanced, although not essential, by using a fuel shuffling arrangement in which the new fuel elements are introduced into the central region of the core and discharged from the outer region.

Therefore, it is an object of this invention to provide a refueling method for a nuclear reactor which improves the coolant void reactivity effect.

A further object of the invention is to provide a refueling pattern for a fast nutron sodium-cooled nuclear reactor having a core surrounded by neutron reflective material, and wherein the new fuel is introduced into the central portion of the core.

Another object of the invention is to provide a refueling arrangement for a fast reactor which utilizes "clean" plutonium recycled from the blanket and "dirty" plutonium recycled from the core to achieve a considerable improvement in coolant void reactivity effect.

Another object of the invention is to provide a refueling method for fast neutron sodium-cooled nuclear reactors which includes placing fuel elements containing fissile fuel having a Pu-240 isotope content greater than about 25% in the outer region of the core and placing fuel elements containing fissile fuel having a Pu-240 isotope content less than 8% proximate the central region of the core, whereby the central positive coolant void reactivity effect is reduced.

Other objects of the invention, not specifically set forth above, will become readily apparent from the following description and accompanying drawings, wherein:

BRIEF DESCRIPTION OF THE DRAWINGS

FIG. 1 schematically illustrates one-half of a ball or sphere configured core and associated breeder blanket for theoretical explanation of the invention;

FIG. 2 is a flow chart for the FIG. 1 configuration;

FIG. 3 is a schematical view of a fast breeder reactor utilizing an annular core configuration for carrying out the invention; and FIG. 4 is a flow chart illustrating the operation of the FIG. 3 embodiment.

DESCRIPTION OF THE INVENTION

As pointed out above, in large fast reactors, loss of coolant (such as sodium) from the central portion of core produces positive reactivity, while coolant loss from the outer portion of the core and from the blankets generally produces negative reactivity. The positive coolant void reactivity effect in the central region is a safety hazard if its magnitude is large enough to produce a rapid reactivity ramp rate in a credible accident. Thus, it is important to minimize the central positive coolant void reactivity effect, which is accomplished by this invention. Since Pu-240 and fission products are large contributors to the positive coolant void effect in a plutonium-fueled fast reactor which recycles its plutonium and achieves high fuel burnup, the positive coolant void reactivity effect is minimized by this invention by removing most of the Pu-240 from the central portion of the core. When fuel shuffling, as described hereinafter, is also used in the inventive refueling pattern, it will also reduce the fission product concentration in the center core region. Thus, utilizing this invention, the resulting core configuration will have less Pu-240 and fission products in the central region and more of these isotopes in the outer region. Hence, the reduced positive coolant void reactivity effect in the center of the core is achieved partly at the expense of a reduced negative coolant void reactivity effect in the outer regions of the core.

As utilized hereinafter, the term "clean" plutonium means that it is almost pure Pu-239 (generally less than 8% Pu-240), while the term "dirty" plutonium means that it has been sufficiently irradiated to have a high Pu-240 content (generally greater than 25%).

To illustrate the inventive concept in its broadest form, reference is made to the drawings wherein FIG. 1 shows a spherical core having radially extending zones A, B and C, and which is provided with a breeder blanket extending thereabout. While not shown, the device is provided with the necessary neutron reflective material. The operation of such an arrangement is illustrated in the FIG. 2 flow chart, wherein the $PuO_2$-$UO_2$ which contains "clean" plutonium is introduced into the center or zone A of the core from that obtained by recycling the plutonium produced in the breeder blanket, which may, for example, initially contain $UO_2$, or from another source; after a period of exposure, the $PuO_2$-$UO_2$ from core zone A which now contains partially "dirty" plutonium is transferred to intermediate core zone B, while additional fuel which has been recycled from core periphery or zone C after reprocessing, as known in the art to remove the fission products, is also introduced into intermediate core zone B for further exposure; after a period of such further exposure, the fuel from core zone B is transferred to core zone C for final exposure, after which the fuel is discharged and the "dirty" discharged plutonium, after reprocessing, is recycled into core zone B, while the "clean" plutonium produced in the breeder blanket is introduced only in the central core zone A.

It is thus seen that with the inventive fueling method, the central area or zone (zone A) of the core contains "clean" plutonium at all times; and the intermediate area or zone (zone B) of the core contains fairly "clean" plutonium; while the outer or peripheral area or zone (zone C) of the core contains substantially "dirty" plutonium. In addition, core zone A at midburnup of an operating cycle between refuelings contains only about one-third as many fission products as would be the case without the novel fueling method.

While it is realized that the use of the theoretical spheric core configuration may not be practical for general applications, this configuration clearly points out the advantages derived from this invention, as will become more apparent from the following description of the FIG. 3 embodiment which utilizes a more annular-shaped core configuration.

Referring again to the drawings, an embodiment of one reactor of an entire system of reactors utilizing the invention is schematically illustrated in FIG. 3, and comprises an annular-shaped core generally indicated at 10 having associated therewith, as known in the art, an axial breeder blanket 11, inner radial breeder blanket 12, outer radial breeder blanket 13, inner reflector 14 and an outer reflector 15, the core breeder blankets and reflectors being symmetrical about a core midplane 16. The height above core midplane is indicated at 17, which may, for example, be thirty-nine inches, while the diameter 18 of the illustrated reactor may be, for example, 168 inches. A fuel element indicated at 19 is shown extending into the central portion of core 10 and axial blanket 11. Core 10 is divided into six zones and designated core zone 1 through core zone 6 in the drawings. While only one fuel element 19 is shown, each fuel element is assumed to enter continuously through the core 10 and the corresponding portion of axial blankets 11.

As shown in FIG. 3, fuel elements 19 are loaded into the central radial core zones 1 and 4 and the axial blanket positions adjacent to core zone 4. The fuel element 19 is fabricated such that the $PuO_2$–$UO_2$ (fissile fuel) indicated as section 20 which is located in core zone 1, contains "clean" plutonium. Such "clean" plutonium may be obtained by recycling the plutonium produced in the breeder blankets of such fast reactors or from outside sources. (Other sources of "clean" plutonium may also be used if available; but the overall system which may contain several such reactors must be self-sustaining to assure successful application of the concept.) The $PuO_2$-$OU_2$ (fissible fuel) indicated as section 21 of fuel element 19 and located in core zone 4, uses plutonium which has been recycled after discharge from the cores of such fast reactors, wherein the fission products are removed by chemical process from the plutonium, as known in the art. The section 22 of the fuel element 19 introduced into the axial blankets 11 contains $UO_2$ and no plutonium, thus being considered as fertile fuel. Since the fabrication technique of the fuel elements does not constitute part of this invention and are known in the art, a detailed description thereof is deemed unnecessary. The radial breeder blankets 12 and 13 are initially provided with $UO_2$ in a manner known in the art.

script (2) means the same as subscript (1) except for uniform plutonium concentration in the core and no fuel shuffling, where core plutonium is recycled using blanket plutonium only for makup; and subscript (3) corresponds to total sodium loss in core zones 1 and 2, and no loss of sodium from other core zones (3–6) or blankets (11–13).

TABLE II.—REACTOR PARAMETER FOR AN ANNULAR CORE WITH SPATIAL VARIATIONS OF THE PLUTONIUM ISOTOPIC COMPOSITION

Fuel isotopic compositions at midburnup of an equilibrium cycle

|  | Core zone (1) | | | | | | Reference annular core configuration (2) |
|---|---|---|---|---|---|---|---|
|  | 1 | 2 | 3 | 4 | 5 | 6 | |
| Pu-239 (a./o.) | 19.24 | 16.51 | 14.76 | 20.99 | 18.59 | 16.96 | 15.67 |
| Pu-240 (a./o.) | 2.03 | 2.86 | 3.36 | 7.58 | 7.79 | 7.88 | 8.81 |
| Pu-241 (a./o.) | 0.08 | 0.22 | 0.34 | 1.11 | 1.22 | 1.30 | 1.98 |
| Pu-242 (a./o.) | ~0 | 0.01 | 0.02 | 0.14 | 0.17 | 0.20 | 1.07 |
| Fission product pairs (a./o.) | 2.91 | 7.58 | 11.07 | 2.19 | 6.10 | 8.96 | 5.80 |
| U-238 (a./o.) | 75.74 | 72.82 | 70.45 | 67.99 | 66.13 | 64.70 | 66.67 |
| Exposure ($10^3$ mwd./t.): | | | | | | | |
| Beginning of cycle | 0 | 49 | 91 | 0 | 33 | 61 | 0 |
| Midburnup of cycle | 25 | 70 | 106 | 17 | 47 | 71 | 50 |
| End of cycle | 49 | 91 | 120 | 33 | 61 | 80 | 100 |

Parameters of annular cores at midburnup of an equilibrium cycle

|  | Case 1 | Case 2 | Case 3 |
|---|---|---|---|
|  | Fuel management scheme of above six-zone core | Same as Case 1 except that the fuel is not shuffled | Reference core configuration (2) |
| Core average fissile enrichment (a./o. Pu-239+Pu-241) | 18.6 | 19.0 | 17.6 |
| Total breeding ratio | 1.20 | 1.22 | 1.27 |
| Core conversion ratio | 0.52 | 0.50 | 0.56 |
| Doppler coefficient (Tdk/dT) | −0.0069 | −0.0069 | −0.0068 |
| Maximum sodium void ($\Delta k$)(3) | +0.004 ($1.2) | +0.005 ($1.5) | +0.007 ($2.1) |

The fuel elements are radially shuffled in a three-batch scheme, as clearly illustrated in FIG. 4. Thus, fuel introduced into core zone 1 experiences its first burnup exposure in core zone 1, its second exposure in core zone 2, and its third exposure in core zone 3, whereafter it is discharged for reprocessing. Fuel introduced into core zone 4 is shuffled to core zones 5 and 6 in successive burnup cycles, and is discharged from core zone 6 for reprocessing. The plutonium discharged from core zones 3 and 6 is processed by chemical processes known in the art and recycled into core zone 4 with fuel element 19 (element section 21). The "clean" plutonium discharged from the axial breeder blanket 11 adjacent to core zone 6 and from one-third of the radial breeder blankets 12 and 13 is processed in a manner known in the art and recycled into core zone 1 with the fuel element 19 (element section 20). The processing details of the plutonium does not constitute part of this invention and thus the details thereof are not included herein, but are well known in the art.

The following table (Table I) sets forth the volumetric compositions (v./c.) utilized during all stages of operation in the embodiment illustrated in FIG. 1:

TABLE I

| Component | $PuO_2$-$UO_2$ | Steel | Sodium | BeO |
|---|---|---|---|---|
| Core | 25 | 17 | 50 | 8 |
| Axial blankets | ¹25 | 17 | 50 | 8 |
| Radial blankets | ¹50 | 20 | 30 | 0 |

¹ Introduced as $UO_2$.

With the above-described fueling pattern, core zone 1 contains very "clean" plutonium at all times; and core zone 2 contains fairly "clean" plutonium. Also, core zone 1 at midburnup of an operating cycle between refuelings contains only about one-third as many fission products as would be the case with no fuel shuffling.

The following table (Table II) shows the plutonium isotopic composition and fission product concentration in each zone compared with that obtained in an equilibrium cycle for a uniform core distribution in which the core plutonium is recycled and blanket plutonium used only for makeup. Total burnup of the fuel discharged is assumed to be 100,000 mwd./t. The subscript (1) on Table II references the fueling pattern described above; sub- Most of the positive central sodium void reactivity effect occurs in core zone 1 and the remainder in core zone 2. All other core zones (3–6) contribute negative reactivities upon loss of sodium, and thus the low content of Pu-240 and fission products in core zone 1 and the relatively low content of Pu-240 in core zone 2, resulting from this fuel pattern, considerably reduces the maximum coolant void reactivity effect which is produced by complete voiding of sodium from core zones 1 and 2 (see Table II).

Several variations of the fuel management scheme or pattern set forth above with respect to the embodiment illustrated in the drawings are possible. One of these would recycle the plutonium discharged from core zone 3 into the fuel element 19 (section 21) of core zone 4, using only as much of the plutonium discharged from core zone 6 as needed for makeup in core zone 3. This is a refinement of the basic fuel management scheme or method described above. It results in a more complicated processing since the discharged plutonium from core zones 3 and 6 must be segregated as well as the plutonium discharged from the blankets 11–13. Since it is easier to perform the calculations of fuel isotopic compositions for a core which uses this refinement of the basic fueling pattern, the results listed in Table II are based on a scheme that used this refinement.

The results shown in Table II (compare Cases 1 and 3) indicate that the proposed scheme is effective in reducing the positive central coolant void reactivity effect. Voidage of sodium from core zones 1 and 2 which produces 2.1 $\Delta k$ in the reference case (Case 3, bottom line) gives only 1.2 $\Delta k$ with the present fueling method (Case 1, bottom line). There is some penalty in the fuel economy; the breeding ratio is reduced from 1.27 to 1.20 (see fourth from last line in Table II).

Fuel shuffling has some disadvantages; it complicates the mechanical problems associated with refueling and produces a higher radial power peaking factor. Case 2 of Table II shows the effect of using the inventive fueling method without fuel shuffling. In this case, fuel batches utilizing fuel elements fabricated as described above are introduced into each radial core zone and discharged from the same zone when they have reached the target burnup. (Core zone sets 1 and 4, 2 and 5, and 3 and 6 constitute the three radial core zones of the annular core configuration shown in FIG. 3 for Case 2.) Fuel burnup for Case 2 was 100,000 mwd./t. and a three-batch fueling was used (same as for Case 1, except Case 1 used fuel shuffling). Without shuffling (see Case 2), the advantage of reduced fission products in the central core region is lost. This is partially compensated, however, by having lower fission product concentration in the outer core zones. Comparison of the results of Cases 1, 2 and 3 in Table II (fifth from last line) shows that most of the desired effect on sodium void reactivity change is achieved even without shuffling the fuel, there being, in these cases, a difference of 2 between Cases 1 and 3, and only a difference of 0.4 between Cases 1 and 2.

The amount of "clean" plutonium available from fast reactor blankets could be a limiting factor on the effectiveness of the present fueling method when considered in an entire system utilizing an increasing number of new reactors. For this purpose, it is advantageous to have much of the breeding of new fissile material occurring in the blankets. High blanket breeding, relative to in-core breeding, is characteristic of reactor core configurations having a large neutron leakage. However, the coolant void reactivity problem may require such a high leakage core. The annular core 10 illustrated in FIG. 3 satisfies this requirement. The amount of "clean" plutonium discharged from one-third of the radial blankets 12 and 13 is about 10% more than that needed to fuel core zone 1. Other "leaky" core configurations that could satisfy the requirement for "clean" plutonium include thin cylinders (either pancake or cigar-shaped) and small core modules separated by blankets. It is again pointed out that normally a system of this type involves more than one fast breeder reactor.

The requirement for "clean" blanket plutonium becomes even more limiting if the fraction of recycled blanket plutonium of the entire system cannot be larger than the fraction of recycled core plutonium of the entire reactor system. This would be the case in a growing economy of similar fast reactors, with the new reactors in a system demanding the same mix of "clean" and "dirty" plutonium for initial operation as those reactors in the system which are in operation. In this case, the height 17 of the axially central zone (core zones 1 and 4) containing "clean" plutonium in the new fuel 19 would have to be reduced to the amount of available "clean" plutonium permitted. (Note in the drawing that core zones 1 and 4 are the same height.) By going to core configurations of higher neutron leakage, thereby increasing blanket breeding relative to core breeding, the fueling pattern of this invention can be made to accommodate a rapidly growing fast reactor economy without seriously restricting the height of the zone or zones containing "clean" plutonium.

The reactor embodiment illustrated in the drawing used oxide fuel in both core 10 and blankets 11–13. With the present fueling method, other fuels such as carbon, metal, or alloy, can be used in place of oxide in the core, the blanket, both core and blanket, or in specific portions of the core and blanket. The novel method is especially pertinent to sodium or other coolants of low atomic weight in the liquid state because the central void reactivity problem is most acute for such coolants. However, it may also be used for steam-cooled or gas-cooled fast reactors, although the incentive is less for the latter. This fueling method may be used with cladding materials other than stainless steel, such as Inconel, Nichrome, molybdenum, tantalum, vanadium, zircaloy, niobium, or combinations of these with iron, nickel, and chromium, or with each other, or even with a ceramic cladding material.

Other moderator materials may be used in place of BeO with this fueling method, such as Be, ZrH, carbon, $Al_2O_3$, and MgO, or the reactor may not have any moderator additive in its core composition.

In addition, this unique fueling method can be used in reverse to improve the breeding ratio and fuel economics at the expense of the sodium void reactivity. This would be done by fabricating fuel elements in such a manner as to concentrate the "clean" plutonium in the outer portion of the core (zones 3 and 6) and the "dirty" plutonium in the central portion (zones 1 and 4), whereby breeding would be increased. Such reversed application of the instant concept is less likely to be of interest in the short-term period than that of minimizing the central coolant void reactivity effect; but it may be used in the long-term when safety criteria for fast reactors have been firmly established.

It is thus seen that the present invention provides a method in which the "clean" and "dirty" plutonium recycled from fast breeder reactors are segregated in reprocessing and fabrication of new fuel elements in such a manner that the "clean" plutonium is loaded into the central core region (both radial and axial) of these fast reactors. This results in a significant reduction of the positive coolant void reactivity effects which is dominant in the central core regions. Application of this fueling method in conjunction with fuel shuffling further reduces the central core coolant void reactivity effect.

Although particular methods have been described and an embodiment of an apparatus for carrying out the invention has been illustrated, modifications and changes will become apparent to those skilled in the art; it is intended to cover in the appended claims all such modifications and changes as come within the spirit and scope of this invention.

I claim:
1. A method for refueling a fast neutron sodium-cooled nuclear breeder reactor having a core surrounded by at least one breeder blanket and neutron reflective material wherein coolant void reactivity effect is substantially improved, comprising the steps of: introducing, into the central region of the core, fuel elements containing $PuO_2$-$UO_2$ having plutonium with less than 8% Pu-240 isotope content for initial exposure; discharging from the outer region of the core fuel elements containing plutonium with greater than 25% Pu-240 isotope content; processing the discharged fuel to remove the fission products from the plutonium; and reintroducing the reprocessed fuel into an intermediate region of the core for further exposure.

2. The method defined in claim 1, additionally including the steps of: transferring fuel elements after initial exposure from the central region into the intermediate region of the core for further exposure; introducing new fuel elements containing less than 8% Pu-240 in the central region of the core; and, after further exposure of the fuel elements in the intermediate region of the core, transferring the fuel elements from the intermediate region to the outer region of the core for additional exposure prior to discharge therefrom.

3. The method defined in claim 1, additionally including the steps of: fabricating fuel elements such that at least a first portion thereof includes the $PuO_2$-$UO_2$ having less than 8% Pu-240 isotope content, at least a second portion including the processed plutonium having greater than 8% and less than 25% Pu-240 isotope content, and at least a third portion containing $UO_2$ with no plutonium; and introducing the thus fabricated fuel elements into the core and associated breeder blanket for exposure thereof such that the first and second portions of the fuel elements are positioned in the core and the third portion thereof positioned in the breeder blanket.

4. The method defined in claim 3, wherein the central, intermediate and outer regions of the core comprise central, intermediate and outer radial zones of the core, and including the additional step of: dividing each of the central, intermediate and outer core zones into at least two axially aligned sections; and positioning fuel elements in the core zones such that the first portion of each of the fuel elements is in one of the two axially aligned sections of the core zones, and the second portion of each of the fuel elements is in the other of the two axially aligned sections of the core zones.

5. The method defined in claim 3, wherein the central, intermediate and outer regions of the core comprise central, intermediate and outer radial core zones, and including the additional steps of: dividing each of the central, intermediate and outer core zones symmetrically about a midplane, such that on each side of the midplane, the core zones consist of at least first and second axially aligned sections; fabricating the fuel elements such that the material of the first, second and third portions extends symmetrically from a midplane thereof; and positioning the fuel elements in the core zones and breeder blankets such that the material of the first and second portions of the fuel elements is located respectively in the first and second axially aligned sections of the core zones, and the material of the third portion of the fuel elements is located in the breeder blankets.

6. The method defined in claim 5, additionally including the steps of: shuffling the fuel elements such that, after a burnup exposure has been experienced by the fuel elements positioned in the outer core zone, the fuel elements therein are discharged for processing and recycling such that the plutonium discharged from the core constitutes the plutonium in the material of the second portion of the fuel element, moving the fuel elements positioned in the intermediate core zone into the outer core zone for burnup exposure thereof, relocating the fuel elements from the central core zone to the intermediate core zone for further burnup exposure thereof, and introducing the thus fabricated new fuel elements into the central core zone for initial burnup exposure, whereby the fuel elements containing $PuO_2$-$UO_2$ having plutonium with less than 8% Pu-240 isotope content are initially introduced at the first sections of the central radial zone of the core, and plutonium having a Pu-240 isotope content greater than about 25% is located in the outer radial zone of the core, thereby resulting in a significant reduction of the coolant void reactivity effect.

7. The method defined in claim 3, additionally including the steps of: shuffling the fuel elements such that, after a period of burnup exposure has been experienced by fuel elements in the central radial zone of the plurality of radial core zones, the fuel elements therein are moved outwardly to the adjacent radial zone for further burnup exposure; the fuel elements in the outer radial zone having reached target burnup are discharged for processing and recycling such that the plutonium discharged from the core constitutes the plutonium in the second portion of the fuel element, and introducing a new fuel element into the central radial zone for initial burnup exposure, whereby fuel elements are initially introduced in the central radial zone and discharged from the outer radial zone, thereby improving the coolant void reactivity effect.

8. The method defined in claim 7, wherein the central, intermediate and outer regions of the core comprise central, intermediate and outer radial zones of the core, and including the additional steps of: dividing each of the central, intermediate and outer radial core zones symmetrically about a midplane such that the core zones consist of at least first and second axial sections on each side of the midplane of the core; fabricating the fuel elements such that the material of the first, second and third portions thereof extends symmetrically about a midplane thereof such that the fuel elements include at least two sections having material of the first, second and third portions thereof; and positioning the fuel elements in the core zones and axial blankets such that the material of the first and second portions on each side of the midplane of the fuel elements is located respectively in the first and second axial sections of the core zones on each side of the midplane of the core, and the material of the third portion on each side of the midplane of the fuel elements is located in the axial blankets adjacent the core, whereby the thus defined shuffling operation initially introduces the fuel element material containing $PuO_2$-$UO_2$ having plutonium with less than 8% Pu-240 isotope content in the first sections of the central radial zone of the core, plutonium having a Pu-240 isotope content greater than about 25% is substantially maintained in the outer radial zone of the core, and plutonium having a Pu-240 isotope content intermediate that in the central and outer radial zone is maintained in the intermediate radial zone.

References Cited

UNITED STATES PATENTS

| 3,140,234 | 7/1964 | Loewenstein | 176—40 |
| 3,335,061 | 8/1967 | Winsche et al. | 176—30 |
| 3,364,119 | 1/1968 | Nims et al. | 176—18 |

FOREIGN PATENTS

| 1,126,528 | 3/1962 | Germany | 176—30 |

OTHER REFERENCES

Fuel Cycles in Nuclear Reactors (Thesis), R. T. Shanstrom, M. Benedict, C. T. McDaniel, Aug. 24, 1959, pp. 1, 85, 88, 92–94.

BENJAMIN R. PADGETT, Primary Examiner

E. E. LEHMANN, Assistant Examiner

U.S. Cl. X.R.

176—17